Figure 1:
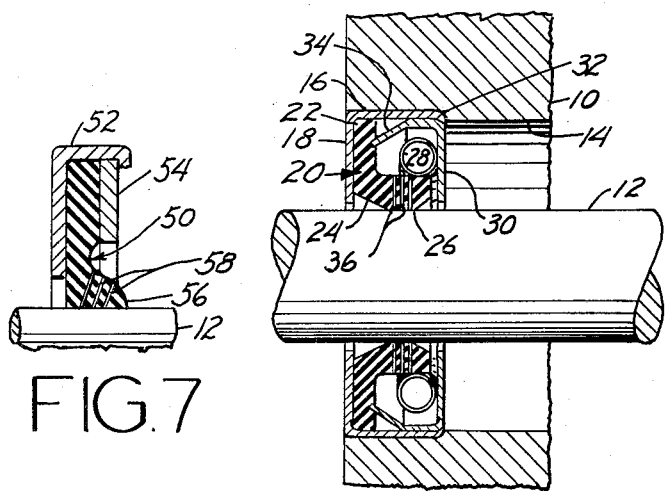

July 17, 1962     C. W. CHILLSON     3,044,786

SHAFT SEAL

Filed May 2, 1957

*INVENTOR.*
CHARLES W. CHILLSON
BY *Godfrey B. Speir*

United States Patent Office 3,044,786
Patented July 17, 1962

3,044,786
SHAFT SEAL
Charles W. Chillson, Packanack Lake, N.J., assignor to Curtiss-Wright Corporation, a corporation of Delaware
Filed May 2, 1957, Ser. No. 656,707
2 Claims. (Cl. 277—70)

This invention relates to shaft seals of the type in which a resilient seal ring is secured to one member, the seal ring engaging another member rotatable with respect to the first member.

Seals of this type are well known in industry and have been constructed in various manners to fulfill various specific requirements. In many seal assemblies the resilient sealing member is made of leather which has excellent characteristics for sealing purposes. In some applications, however, the porosity of the leather permits leakage even though the seal between the leather and a rotating shaft is effective. More recently, some resilient seal rings have been made from rubber and other elastomeric synthetics. These, on the whole, giving effective results, particularly when the dry coefficient of friction between the elastomer and a rotating shaft is low.

The present invention provides resilient seal rings preferably of elastomeric synthetics which are constructed to have especially oriented porosity limited to the zone of contact between a seal ring and the rotating shaft. By means of this controlled porosity, lubricant may pass to the sealing joint, lowering the coefficient of friction, and, because of the limited porosity, diffusion of fluids through the seal ring is prevented or minimized.

The pores or capillaries retain lubricant for immediate supply to the bearing faces on starting of rotation, and thereby avoid dry starting which, more than any other factor, causes premature wear or leakage of an impervious resilient seal ring.

The invention incorporates the principle above mentioned and may take a large number of different actual forms. A few of these forms are illustrated in the attached drawings in which similar reference characters indicate similar parts and in which—

Figure 8:
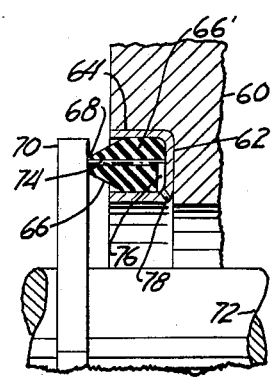
Figure 7:
Figure 2:
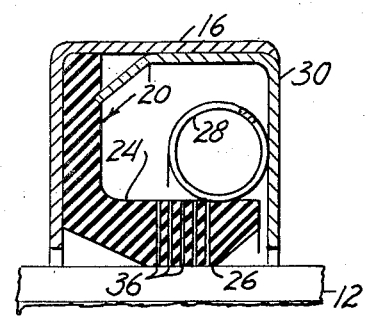
Figure 3:
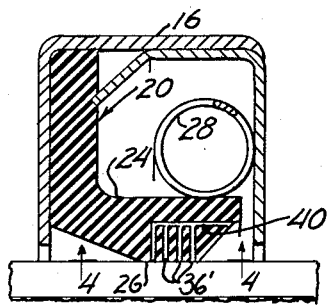
Figure 5:
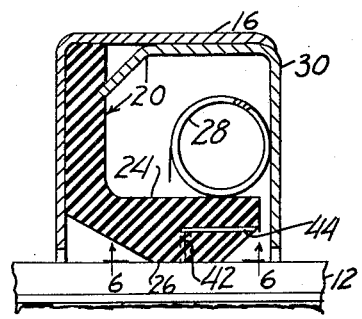
Figure 4:
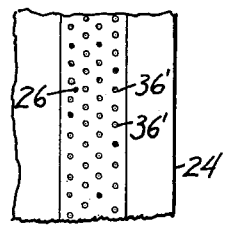
Figure 6:
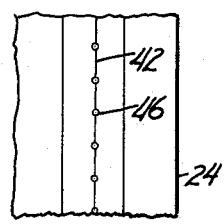

FIG. 1 shows a longitudinal section through a typical seal ring and associated structure, FIGS. 2 and 3 show enlarged sections through alternative embodiments of the seal of the invention, FIG. 4 is a view on the line 4—4 of FIG. 3, FIG. 5 is a longitudinal section through a portion of another arrangement of the seal, FIG. 6 is a view on the line 6—6 of FIG. 5 and FIGS. 7 and 8 are sections through other forms of shaft seals.

Referring to FIG. 1, a portion of a housing structure is shown at 10 and a shaft 12 passes through an opening 14 in the housing. The housing, in conventional fashion, is recessed at 16 to receive a ring seal assembly which comprises an outer shell 18 press fitted in the opening 16, within which seal is contained a resilient seal ring 20 of any suitable flexible or elastomeric sealing material. The ring 20 has an L cross section, limb 22 of which is secured within the shell 18 and the other limb 24 of which embraces the shaft 12. The limb 24 includes a bearing face 26 contacting the shaft. If desired, garter spring 28 may embrace the limb 24 of the ring to hold it more firmly in contact with the shaft 12. The ring 20 and the garter spring 28 are held in assembled relation by a shell 30 clamped within the shell 18 at the corner 32, the shell 30 also having a portion 34 which is partially embedded in the seal ring 20 to hold it securely against the shell 18.

The material of the ring 20 is preferably impervious and non-porous to the fluid, either liquid or gaseous, which is contained within the housing 10, to prevent leakage. The limb 24 is provided with a plurality of quite small radial holes or conduits 36 extending from the bearing face 26 outwardly to the outer surface of the limb 24. During operation, liquids contained in the housing may seep through these conduits 36 to assist in lubricating the seal joint between the bearing face 26 of the seal ring and the shaft 12 greatly decreasing the friction of the ring while in no way increasing any tendency toward leakage since these conduits are limited to transfer of fluid between the points indicated.

They do not permit flow through the seal ring from the inside to the outside of the housing. Thus, the ring of the invention, with its controlled porosity, presents an improvement over seal rings of the prior art.

FIG. 2 shows essentially the same arrangement as that of FIG. 1 in which five rows of conduits 36 are provided between the bearing face 26 and the outside of the limb 24 of the seal ring 20.

In FIGS. 3 and 4, somewhat the same arrangement is shown except that ducts 36' extend only part way through the thickness of the seal ring limb 24 and then connect with header ducts 40 which open to the housing at the inner end of the limb 24 of the seal ring 20. As shown in FIG. 4, the ducts 36 are individually small in diameter and considerable in number, the size of the ducts being analogous to capillaries whereby they give the effect of a uni-directional porous construction.

In FIGS. 5 and 6, porosity of the seal is afforded by an annular slot 42 extending around the ring limb 24 and communicating with a header duct 44 opening to the inside of the housing. In addition to the slot 42, small ducts 46 may intercept the slot to assist in the transfer of fluid or lubricant from the housing to the seal bearing face.

FIG. 7 shows an alternative seal construction comprising a resilient seal ring 50 contained within a seal 52 by a washer 54, the inner portion of the ring 50 having a part 56 which engages the surface of the shaft 12. This is provided with ducts 58 which establish communication from the interior of the housing with which the seal is used and the bearing face of the seal ring on the shaft. These ducts 58 serve the same function as the ducts 36, 36', 42 and 46 previously described.

FIG. 8 shows an alternative face seal arrangement wherein a housing 60 is provided with a recess 62 within which is pressed a seal assembly 64. The latter contains one or more annular resilient seal rings 66, the faces of which sealingly engage, as at 68, a face plate 70, mounted on, or formed integral with, a shaft 72. In the case where one seal ring 66 is used, it is provided with a plurality of small ducts 74 like the ducts previously described which establish communication from the seal face 68 to the interior of the housing through additional ducts 76 at the back of the seal ring and holes 78 comprising drillings formed in the seal 64. The same arrangement may utilize two or more seal rings 66 and 66' nested one within the other, the part between the two constituting the duct 74 to enable fluid to pass between the rings and to reach the seal face 68 for lubrication thereof while preventing leakage therethrough.

Ducts such as 40, 44, 76 and 78 in some of the arrangements may be omitted, and the ducts 36', 42' and 74 left blind at their outer ends. The blind ducts will be supplied with fluid during operation from the bearing surfaces, leaving them filled upon shaft stopping to provide lubrication during restarting.

From the examples disclosed, it should be clear to those skilled in the art that many variations may be made in applying the invention to seal constructions of numerous forms. As implied previously, the principal feature of the invention lies in forming seal rings with uni-directional porosity to enable lubricants to reach seal faces while preventing diffusion of gases or other fluids through those portions of the seal ring remote from the actual sealing face.

While I have shown several embodiments of the invention, modifications and alterations may be made therein to the extent defined in the following claims, without departing from the spirit or scope of the invention.

I claim:

1. A fluid seal comprising an elastomeric ring of fluid-impervious material, a retainer for the ring, said ring having an annular sealing face for sliding engagement with a relatively rotatable part and having a portion for securement to another part, said ring having an annular slit therein intersecting said bearing face, and a duct in the ring communicating with the slit, and fluid-carrying means extending from the duct to outside of the retainer.

2. A fluid seal between relatively rotating members wherein one member comprises a fluid-containing housing and the other member comprises a shaft extending through a housing wall, comprising an elastomeric ring substantially L-shaped in cross section and of fluid-impervious material between the housing wall and shaft with one limb of said L-shaped cross section sealingly secured to the housing and the other limb including a portion with an annular area in bearing engagement with said other member, said other limb having a plurality of separate fluid ducts formed in said portion and opening at their one ends at said other member, said other limb also including fluid carrying means extending from the separate ducts and communicating at all times with fluid contained by the seal, the portion of said other limb including said separate ducts being the only portion of the ring in bearing engagement with said other member.

References Cited in the file of this patent
UNITED STATES PATENTS

| | | |
|---|---|---|
| 1,733,416 | Lebesnerais | Oct. 29, 1929 |
| 1,897,804 | Hoffman | Feb. 14, 1933 |
| 2,177,441 | Pesarese | Oct. 24, 1939 |
| 2,307,874 | Bilde | Jan. 12, 1943 |
| 2,367,403 | Kosatka | Jan. 16, 1945 |
| 2,429,562 | Oakes | Oct. 21, 1947 |
| 2,574,062 | Reynolds | Nov. 6, 1951 |
| 2,606,779 | Jagger | Aug. 12, 1952 |
| 2,692,786 | Reynolds | Oct. 26, 1954 |